United States Patent [19]
Kojima

[11] Patent Number: 4,706,034
[45] Date of Patent: Nov. 10, 1987

[54] SIGNAL DISCRIMINATING APPARATUS FOR EXTRACTING COMPONENT SIGNALS FROM A COMPOSITE SIGNAL

[75] Inventor: Kenji Kojima, Hyogo, Japan

[73] Assignee: Mitsubishi Denki Kabushiki Kaisha, Tokyo, Japan

[21] Appl. No.: 852,388

[22] Filed: Apr. 15, 1986

Related U.S. Application Data

[63] Continuation of Ser. No. 504,111, Jun. 14, 1983, abandoned.

[30] Foreign Application Priority Data

Jun. 17, 1982 [JP] Japan .................................. 57-106012

[51] Int. Cl.$^4$ ........................... H03K 5/00; H04N 9/45
[52] U.S. Cl. ..................................... 328/151; 328/139; 328/109; 307/352; 307/518; 358/20
[58] Field of Search .............. 307/518, 520, 352, 353, 307/231; 328/139, 109, 151, 165; 358/20, 138, 153; 330/252

[56] References Cited

U.S. PATENT DOCUMENTS

| | | | |
|---|---|---|---|
| 3,413,492 | 11/1968 | Schneider | 307/352 |
| 3,789,141 | 1/1974 | Ayaki et al. | 358/20 |
| 3,869,568 | 4/1974 | Ueda et al. | 328/139 |
| 4,001,603 | 1/1977 | Wilcox | 330/252 |
| 4,097,896 | 6/1978 | Avery | 358/153 |
| 4,109,215 | 8/1978 | Comer et al. | 328/151 |

FOREIGN PATENT DOCUMENTS 2208791 10/1972 Fed. Rep. of Germany ........ 358/20

*Primary Examiner*—Stanley D. Miller
*Assistant Examiner*—Timothy P. Callahan
*Attorney, Agent, or Firm*—Sughrue, Mion, Zinn, Macpeak & Seas

[57] ABSTRACT

An apparatus for extracting a specific component signal from a composite signal composed of a first component signal and a second component signal. The apparatus includes two transistors which separate a received composite signal into two separate component signals by way of a sampling signal synchronized with the first or the second component signal of the composite signal, whereby the desired component signal can be selected. In the case of a color television system, the color burst signal can be extracted from the composite color signal.

2 Claims, 9 Drawing Figures

SIGNAL DISCRIMINATING APPARATUS FOR EXTRACTING COMPONENT SIGNALS FROM A COMPOSITE SIGNAL

This is a continuation of application Ser. No. 504,111 filed June 14, 1983, now abandoned.

BACKGROUND OF THE INVENTION

This invention generally relates to an apparatus for separating either one of two component signals from a composite signal, and, more specifically to an apparatus in a color television system for extracting the color burst signal from the composite color signal.

A conventional discriminating circuit removes an unnecessary DC or AC component by employing passive components, such as capacitors, coils and the like.

FIG. 1 is a conventional discriminating circuit which extracts or eliminates the color burst signal $S_B$ from a composite color signal $S_C+S_B$ in a color television system. The composite color signals $S_C+S_B$ is applied to the base of a transistor 7 through a coupling capacitor 4. The transistor 7 is biased by resistors 8 and 10 and a bypass capacitor 9. When a sampling pulse Ps is synchronized with the color burst signal $S_B$, it is at the "H" (high) level; at other times, it is at the "L" (low) level, as shown in FIG. 2(b). This sampling pulse Ps is supplied from a sampling pulse input terminal 2 through resistors 5 and 6 to the base of the transistor 7. When the sampling pulse Ps is at the "H" level, the transistor 7 is in the "ON" state; however, when the sampling pulse Ps is at the "L" level, the transistor 7 is in the "OFF" state. Thus, the conduction of transistor 7 is controlled in accordance with the sampling pulse. When the transistor 7 is in the "ON" state, the collector current $I_1$ of the transistor 7 is a multiple signal consisting of the burst signal $S_B$ and the sampling pulse Ps, as shown in FIG. 2(c). Because the collector current $I_1$ includes the unnecessary sampling pulse Ps, the sampling pulse Ps must be eliminated from the collector current $I_1$. A capacitor 11 and the primary coil 12a of a transformer 12 form a parallel resonant circuit. One side of this resonant circuit is connected to the collector of the transistor 7, and the other side is connected to a voltage source Vcc through a resistor 13. A bypass capacitor 14 is connected to the other side of the resonant circuit in parallel with the resistor 13. Therefore, the collector current $I_1$ is supplied from the voltage source Vcc to the resonant circuit through the resistor 13. The resonant frequency of the resonant circuit is tuned to that of the burst signal $S_B$. Accordingly, the color burst signal $S_B$ appears at the output terminals 3 of the secondary coil 12b. Because the frequency of the sampling pulse Ps is different from the frequency of the burst signal $S_B$, the sampling pulse Ps is not included in the output of the secondary coil 12b. Only the burst signal $S_B$, not including the sampling pulse Ps, is fed to the output terminals 3 of the secondary coil 12b, as shown in FIG. 2(d). Since the conventional discriminating circuit removes the sampling pulse Ps through the use of passive components like the capacitor 11 and the coil 12, it is difficult to make the circuit in the form of an integrated circuit.

SUMMARY OF THE INVENTION

To overcome this problem, the present invention provides a signal discriminating apparatus, without any passive components, for extracting either a first or a second component signal from an input composite signal. The apparatus comprises first and second transistors to receive the input signal, means for selectively driving either the first transistor or the second transistor with a sampling signal synchronized with the first or the second component signal, respectively, and a differential circuit for producing a differential output from the outputs of the first and second transistors and for extracting either the first or the second component signal.

DETAIL DESCRIPTION OF THE PREFERRED EMBODIMENT

Figure 1:
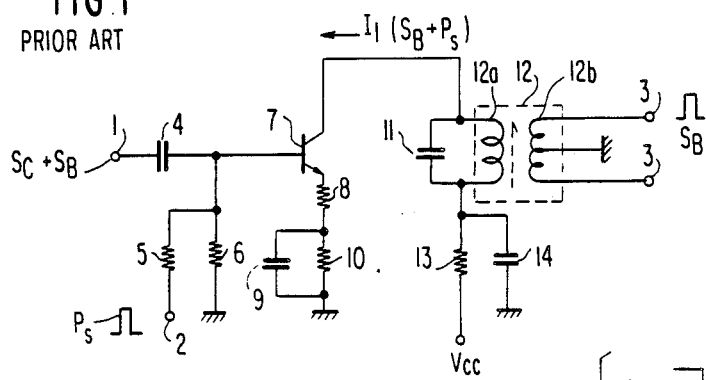
FIG. 1 is a circuit diagram of a conventional discriminating apparatus.
Figure 2:
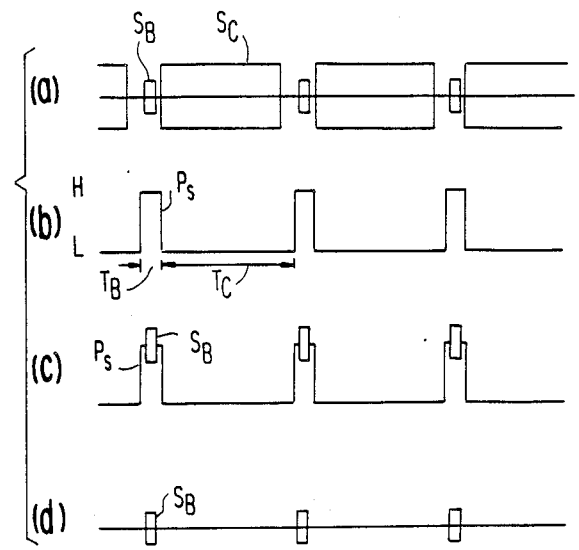
FIGS. 2(a)–(d) are waveform diagrams for describing the operation of the conventional discriminating apparatus.
Figure 3:
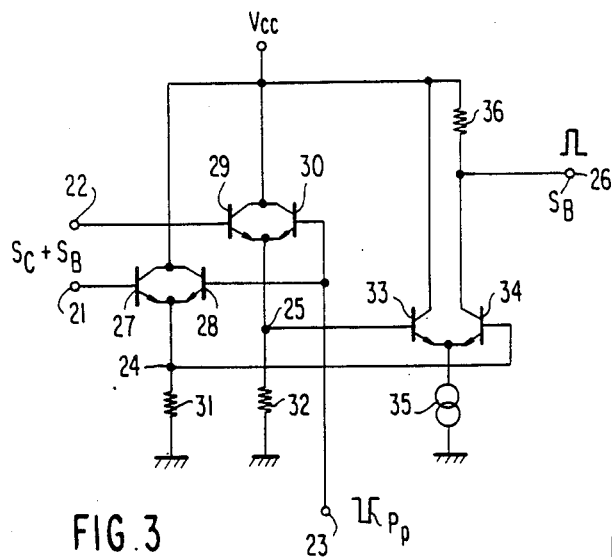
FIG. 3 is a circuit diagram illustrating one example of a discriminating apparatus embodying this invention.
Figure 4:
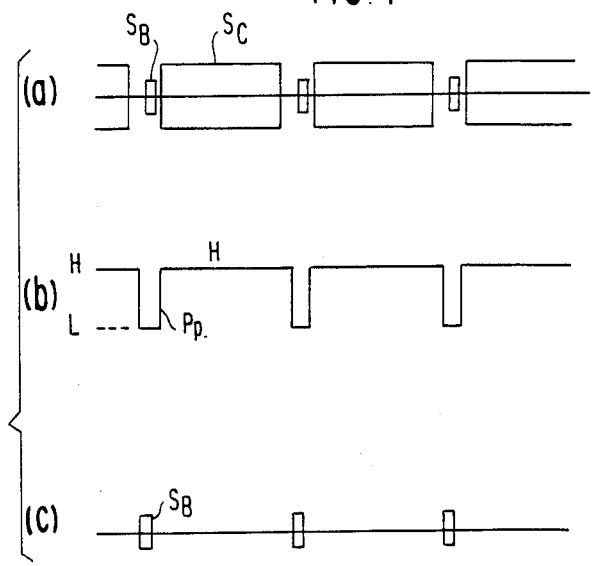
FIGS. 4(a)–(c) are waveform diagrams for describing the operation of the apparatus illustrated in FIG. 3.

FIG. 3 is an example of a discriminating apparatus for separating a composite signal into its first and second component signals. In this example a composite color signal, which consists of a color signal $S_C$ as a first component signal and a burst signal $S_B$ as a second component signal, is separated into two separate signals. The base of a first transistor 27 is connected to a first input terminal 21, the collector is connected to a voltage source Vcc, the emitter is connected to a first output terminal 24, and the emitter of the first transistor 27 is grounded through a resistor 31. The base of a second transistor 29 is connected to a second input terminal 22, the collector is connected to the voltage source Vcc, the emitter is connected to a second output terminal 25, and the emitter of the second transistor 29 is grounded through a resistor 32. The base of a third transistor 28 is connected to a third input terminal 23, the collector is connected to the voltage source Vcc, and the emitter is connected to the first output terminal 24. The base of a fourth transistor 30 is connected to the third input terminal 23, the collector is connected to the voltage source Vcc, and the emitter is connected to the second output terminal 25 respectively. The emitters of transistors 33 and 34 are common connected and grounded through a constant current source 35. The collector of the transistor 33 is connected to the voltage source Vcc, and the collector of the transistor 34 is connected to the voltage source Vcc through a load resistor 36. The transistors 33 and 34 form a differential amplifier. As shown in FIGS. 4(a) and 4(b), a sampling pulse $P_p$ is at the "L" level in the periods corresponding to the burst signal $S_B$, and it is at the "H" level in the periods corresponding to the color signal $S_C$. The sampling pulse $P_p$ is supplied to the bases of the third and the fourth transistors 28 and 30 from the third input terminal 23.

When the sampling pulse $P_p$ is at the "L" level, the base bias for the third and the fourth transistors 28 and 30 is in the "L" state relative to the bias of the first and the second transistors 27 and 29, so both the third and the fourth transistors 28 and 30 are cut-off. When the composite color signal is applied to the first and second input terminals 21 and 22, the first transistor 27 and the second transistor 29 are placed in the ON state, and, therefore, output signals appear at the first output terminal 24 and the second output terminal 25. The two output signals are then fed to the differential amplifier which is composed of the transistors 33 and 34 and the constant current source 35. The output signal at the first output terminal 24 is fed to the base of the transistor 34, and the output signal at the second output terminal 25 is fed to the base of the transistor 33; thus a differential signal is received by the third output terminal 26 from the differential amplifier.

However, when the sampling pulse $P_p$ is at the "H" level, the base bias potentials of the third and the fourth transistors 28 and 30 are placed in the "H" state so that these transistors are turned ON, whereby the first and second transistors 27 and 29 are current cut-off. As a result, output signals do not appear at the first and second output terminals 24 and 25, and a differential signal from the differential amplifier does not appear at the third output terminal 26. Thus, transistors 28 and 30 form a controlling or selective driving means for controlling the conduction of the input transistors 27 and 29 in accordance with the level of the sampling pulse.

As described above, only when the sampling pulse $P_p$ is at the "L" level, does the burst signal $S_B$ appear at the third output terminal 26. In this case, the color signal $S_C$ does not appear at the third output terminal 26. An output waveform of this type is shown in FIG. 4(c), where only the waveform of the burst signal $S_B$ is taken out. A difference in direct potential between the first output terminal 24 and the second output terminal 25 in the burst signal periods and the color signal periods does not appear at the third output terminal 26 because of the operation of the differential amplifier. The circuit shown in FIG. 3 can be connected directly to the next circuit because the direct potential of the circuit is constant.

The component signal $S_C$ can be extracted by the circuit of FIG. 3 by applying a sampling signal having a waveform of opposite polarity to that shown in FIG. 4(b).

According to the present invention, since a simple circuit composed of transistors and resistors, without using inductance elements and capacitors, is utilized for extracting a desired signal, the circuit can easily be made as an integrated circuit.

I claim:

1. A signal discriminating apparatus for selectively extracting either first or second component signals from an input composite signal composed of said first and second component signals which are alternatively produced, comprising first and second transistor means having respective input terminal means for simultaneously receiving said input composite signal and having respective output terminals, controlling means, coupled to said first and second transistor means, for controlling the conduction, and, thus, the outputs of said first transistor means and said second transistor means, in accordance with sampling signals synchronized with said first or second component signals, supplying means for supplying said sampling signals to said controlling means, and differential circuit means coupled to said output terminals of said first and second transistor means for producing a differential output signal corresponding to either of said first or second component signals;

wherein each of said first and second transistor means has a base, a collector and an emitter, said input terminals are the bases of said first and second transistor means, said controlling means comprises a third and a fourth transistor means each having a base, a collector and an emitter, said third transistor means and said first transistor means, as well as said fourth transistor means and said second transistor means, having their collectors connected in common and their emitters connected in common, respectively, and said supplying means supplies said sampling signals to the bases of said third transistor means and said fourth transistor means.

2. A signal discriminating apparatus according to claim 1, wherein said sampling signals have either a high level or a low level for turning on and off said first and second transistor means in accordance with the levels of said sampling signals.

* * * * *